United States Patent
Amante

(10) Patent No.: US 10,142,225 B2
(45) Date of Patent: Nov. 27, 2018

(54) APPARATUS, SYSTEM, AND METHOD FOR PACKET SWITCHING

(71) Applicant: LEVEL 3 COMMUNICATIONS, LLC, Broomfield, CO (US)

(72) Inventor: Shane Amante, Denver, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 15/786,818

(22) Filed: Oct. 18, 2017

(65) Prior Publication Data

US 2018/0041430 A1 Feb. 8, 2018

Related U.S. Application Data

(63) Continuation of application No. 14/089,547, filed on Nov. 25, 2013.

(60) Provisional application No. 61/729,862, filed on Nov. 26, 2012.

(51) Int. Cl.

| | |
|---|---|
| H04L 12/723 | (2013.01) |
| H04L 12/721 | (2013.01) |
| H04L 12/717 | (2013.01) |
| H04L 12/703 | (2013.01) |
| H04L 12/24 | (2006.01) |
| H04L 12/751 | (2013.01) |
| H04L 12/46 | (2006.01) |

(52) U.S. Cl.
CPC .............. *H04L 45/50* (2013.01); *H04L 41/12* (2013.01); *H04L 45/02* (2013.01); *H04L 45/26* (2013.01); *H04L 45/28* (2013.01); *H04L 45/42* (2013.01); *H04L 45/507* (2013.01); *H04L 12/4604* (2013.01); *Y02D 30/30* (2018.01)

(58) Field of Classification Search
None
See application file for complete search history.

(56) References Cited

U.S. PATENT DOCUMENTS

| 7,852,772 B2 | 12/2010 | Filsfils et al. |
| 8,307,422 B2 | 11/2012 | Varadhan et al. |
| 8,441,919 B2 | 5/2013 | Vasseur |

(Continued)

FOREIGN PATENT DOCUMENTS

WO    WO-2014181211 A1    11/2014

OTHER PUBLICATIONS

International Preliminary Report on Patentability, dated May 26, 2015, Int'l Appl. No. PCT/US13/071848, Int'l Filing Date Nov. 26, 2013, 11 pgs.

(Continued)

*Primary Examiner* — Robert C Scheibel

(57) ABSTRACT

An apparatus is provided for control of a plurality of forwarding switches using a network controller. The network controller executes a routing configuration application that analyzes interconnections between the forwarding switches to identify a topology of the network, determine label switched paths (LSPs) between the forwarding switches, and transmits the next hop routes to the forwarding switches. The forwarding switches use the next hop routes to route packets through the network according to a multiprotocol label switching (MPLS) protocol. Each LSP includes one or more next hop routes defining a forwarding address associated with one forwarding switch to an adjacent forwarding switch.

16 Claims, 3 Drawing Sheets

(56) References Cited

U.S. PATENT DOCUMENTS

| | | | |
|---|---|---|---|
| 8,767,735 B2* | 7/2014 | Jacob Da Silva | H04L 45/245 370/392 |
| 2006/0171322 A1* | 8/2006 | Lee | H04L 12/1877 370/244 |
| 2007/0091796 A1* | 4/2007 | Filsfils | H04L 45/00 370/228 |
| 2007/0165515 A1* | 7/2007 | Vasseur | H04L 12/66 370/216 |
| 2008/0198859 A1* | 8/2008 | Elias | H04L 45/02 370/392 |
| 2008/0310430 A1* | 12/2008 | He | H04L 12/462 370/400 |
| 2009/0232029 A1* | 9/2009 | Abu-Hamdeh | H04L 41/0803 370/255 |
| 2010/0043068 A1* | 2/2010 | Varadhan | H04L 12/4633 726/15 |
| 2011/0286324 A1 | 11/2011 | Bellagamba et al. | |
| 2012/0236730 A1* | 9/2012 | Zhou | H04L 45/245 370/244 |
| 2012/0236760 A1 | 9/2012 | Zhou et al. | |
| 2013/0188493 A1* | 7/2013 | Numata | H04L 45/64 370/235 |
| 2014/0098673 A1* | 4/2014 | Lee | H04L 45/64 370/238 |
| 2014/0146664 A1 | 5/2014 | Amante | |
| 2014/0369186 A1* | 12/2014 | Ernstrom | H04L 41/0668 370/228 |
| 2015/0110107 A1* | 4/2015 | Ishizuka | H04L 45/16 370/389 |

OTHER PUBLICATIONS

International Search Report, dated Feb. 19, 2014, Int'l Appl. No. PCT/US13/071848, Int'l Filing Dated Nov. 26, 2014; 3 pgs.
Written Opinion of the International Searching Authority, dated Feb. 19, 2014, Int'l Appl. No. PCT/US13/071848, Int'l Filing Dated Nov. 26, 2014; 9 pgs.
Nadeau, T. et al., "Software Driven Networks Problem Statement: draft-nadeau-sdn-problem-statement-01", *Internet Engineering Task Force, IETF* Standard Working Draft, Internet Society (ISOC) Geneva, Switzerland Oct. 31, 2011, pp. 1-14.
Pan, P. et al., "Software-Defined Network (SDN) Problem Statement and Use Cases for Data Center Applications", *Internet Engineering Task Force, IETF* draft-pan-sdn-dc-problem-statement-and-use-cases-02.txt; Standard Working Draft, Internet Society (ISOC); XP015082042 Mar. 13, 2012, 14 pgs.
Park, Jong H. et al., "BGP Route Reflection Revisited", *IEEE Communications Magazine, IEEE* vol. 50, No. 7 Jul. 1, 2012, pp. 70-75.

* cited by examiner

APPARATUS, SYSTEM, AND METHOD FOR PACKET SWITCHING

CROSS REFERENCE TO RELATED APPLICATION

U.S. nonprovisional application Ser. No. 14/089,547, entitled "APPARATUS, SYSTEM, AND METHOD FOR PACKET SWITCHING," filed on Nov. 25, 2013, now abandoned, the entire contents of which are fully incorporated by reference herein for all purposes. Application Ser. No. 14/089,547 claims priority under 35 U.S.C. § 119 from U.S. provisional application No. 61/729,862, entitled "APPARATUS, SYSTEM, AND METHOD FOR PACKET SWITCHING," filed on Nov. 26, 2012, the entire contents of which are fully incorporated by reference herein for all purposes.

TECHNICAL FIELD

The disclosure generally relates to computer networks, and more particularly, to an apparatus, system, and method for packet switching.

BACKGROUND

Networks, such as the Internet, have numerous networking and computing machines that are involved in transmitting data between machines in the network. One such networking machine is the router. A router is highly complex piece of networking equipment that directs data packets through a network from one machine to another. Generally speaking, a router receives packets of data, determines the destination for those data packets, and then transmits the data packets to the correct port that is connected with the destination or the next stop on a path to the destination. There are numerous decisions and computations involved with determining the next hop on the path to the destination and the router makes those decisions for enormous amounts of data every second. A switch is a similar type networking device that directs packets of data through a network, albeit some switches may make fewer and less sophisticated decisions as to the next hop for a data packet. Regardless, both routers and switches are highly sophisticated and complex pieces of networking equipment.

Conventional routers and switches are typically sold as a vertically integrated device, with a full computer hardware solution integrated with a full software suite. While providing excellent functionality, such vertically integrated devices are very expensive. Moreover, such vertically integrated devices do not provide network providers with the capability to customize the router or switch, to deploy a lighter weight device (one with less software, for example), or to otherwise customize the device or provide unique services or rates within the network.

It is with these inadequacies and concerns in mind, among others, that various aspects of the present disclosure were conceived and developed.

SUMMARY

An apparatus is provided for control of a plurality of forwarding switches using a network controller. The network controller executes a routing configuration application that analyzes interconnections between the forwarding switches to identify a topology of the network, determine label switched paths (LSPs) between the forwarding switches, and transmits the next hop routes to the forwarding switches. The forwarding switches use the next hop routes to route packets through the network according to a multiprotocol label switching (MPLS) protocol. Each LSP includes one or more next hop routes defining a forwarding address associated with one forwarding switch to an adjacent forwarding switch.

According to another aspect, a network controlling method includes analyzing, by a network controller, a plurality of interconnections between a plurality of forwarding switches of a communication network to identify a network topology of the communication network, determining at least one label switched path (LSP) between the forwarding switches, and transmitting the next hop routes to the forwarding switches. The forwarding switches use the next hop routes to route packets through the network according to a multiprotocol label switching (MPLS) protocol. Each LSP includes one or more next hop routes defining a forwarding address associated with one forwarding switch to an adjacent forwarding switch.

According to yet another aspect, a communication network system includes multiple forwarding switches interconnected with one another, and controlled by a network controller. The network controller executes a routing configuration application that analyzes interconnections between the forwarding switches to identify a topology of the network, determine label switched paths (LSPs) between the forwarding switches, and transmits the next hop routes to the forwarding switches. The forwarding switches use the next hop routes to route packets through the network according to a multiprotocol label switching (MPLS) protocol. Each LSP includes one or more next hop routes defining a forwarding address associated with one forwarding switch to an adjacent forwarding switch.

BRIEF DESCRIPTION OF DRAWINGS

The foregoing and other objects, features and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION

Aspects of the present disclosure involve a networking architecture and related apparatus and methods for packet switching using one or more software defined networking (SDN) controllers deployed in a network and in communication with any number of non-vertically integrated forwarding switches. Unlike a conventional vertically integrated router or switch that operates distributing routing protocols, such as open shortest path first (OSPF), border gateway protocol (BGP), or intermediate system to intermediate system (IS-IS), and independently calculates routing tables, the forwarding switches in the present architecture do not necessarily independently calculate routing tables. Instead, the forwarding switch may be a generic hardware device with forwarding plane hardware, such as one or more line cards that provide the ports for connecting to other forwarding switches, needed to forward packets. The forwarding switch may also include a light weight operating system and customized applications, and a SDN controller (or controllers) that runs routing protocols for the network and provides the forwarding paths to the forwarding switches.

Figure 1:
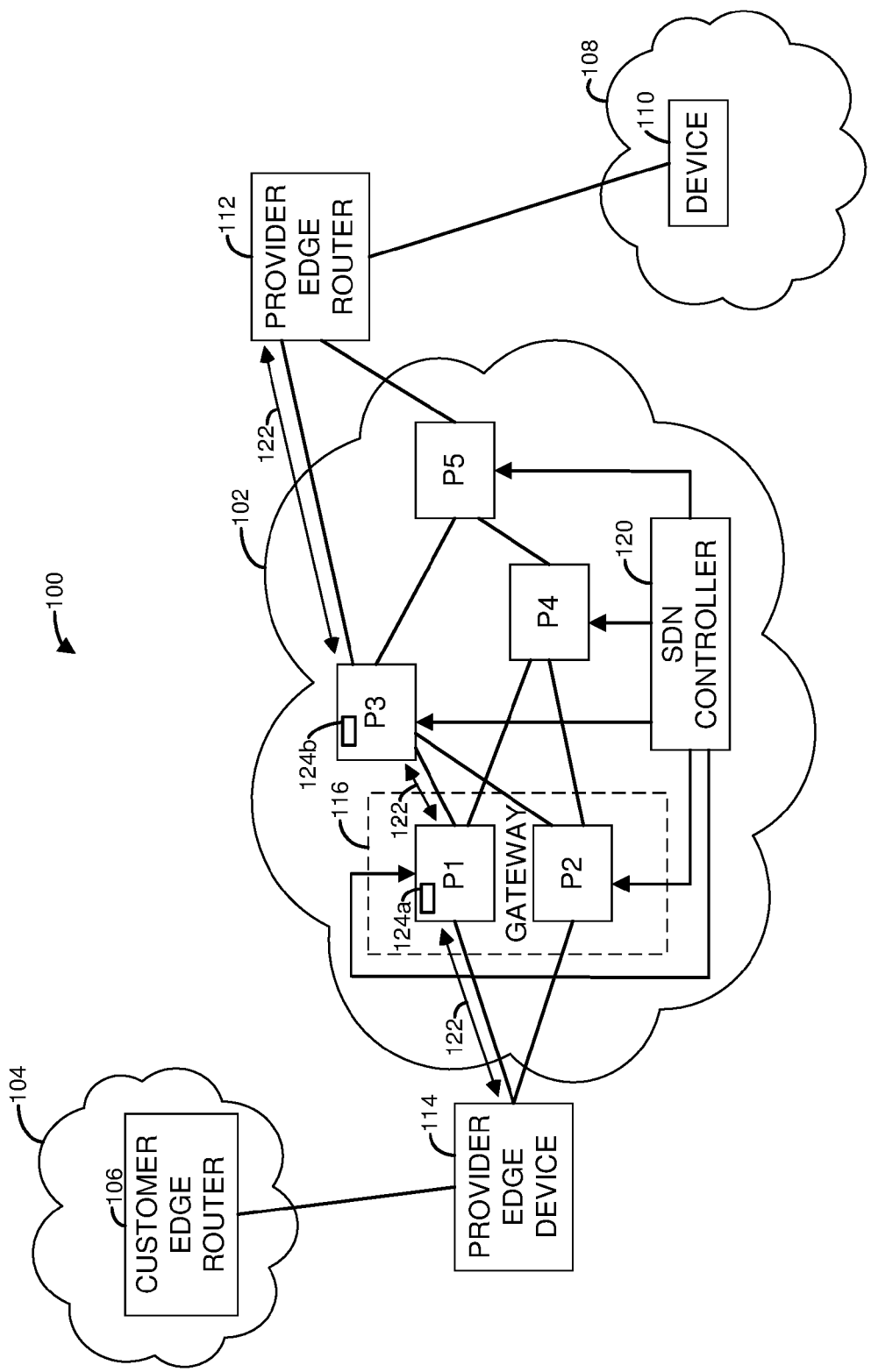
FIG. 1 illustrates an example communication network conforming to aspects of the present disclosure.

FIG. 1 illustrates an example communication network 100 conforming to aspects of the present disclosure. In this example, information flows through a backbone network 102 to and from a customer network, and particularly at a customer edge (CE) router 106 of the customer network 104. For the sake of simplicity, only one customer edge router is illustrated; however, numerous customers of the backbone network 102 along with numerous edge devices may transmit and receive information over the backbone network 102. Also, for the sake of simplicity, the diagram depicts another customer network 108 with a device 110 that receives or transmits information over the backbone network 102 through a provider edge router 112. Additionally, while the term 'customer network' is used herein, the network architecture, devices, and methods discussed herein are applicable to other embodiments where a customer/provider arrangement does not necessarily exist. Similarly, while the illustrated network is a backbone network, the architecture and devices set out herein are applicable to other forms of networks. In any event, the (CE) router 106 is coupled with a provider edge (PE) device 114 that provides a communication point between the customer network 104 and the backbone network 102.

Generally speaking, various devices within the customer network 104, such as local area network devices, are connected to the CE router 106. The CE router 106 is in communication with the provider edge device 114, which may be connected using any type of connection, such as a gigabit Ethernet (GigE) connection. In this example network implementation, the PE device 114 is a conventional vertically integrated device such as a router. The PE device 114 is in communication with a gateway 116 of the backbone network 102. The PE device 114 is configured to interoperate with legacy customer devices, such as the CE router 106, that the backbone network may not control or operate. Thus, the network, by using a conventional PE device 114, may maintain interoperability with conventional devices and protocols without involving any change at the CE router 106 or customer network 104.

Within the backbone network 102, however, one or more conventional routers or switches may be replaced with forwarding switches (P1-P5) whose routes are determined and controlled by one or more SDN controllers 120. The forwarding switches (P1-P5) are relatively non-complex devices in that they are not required to implement routing functionality or conform to other networking standards associated with other networking devices. For example, each forwarding switch may include generic hardware, such as one or more line cards that provide forwarding plane hardware and ports for connecting to other forwarding switches needed to forward packets. Rather than each forwarding switch calculating its own routing information, such as routing table information, the SDN controller 120 determines routing information to be used by each forwarding switch and transmits this routing information to be used by the forwarding switches for routing packets through the communication network 102.

Although the particular embodiment shown only includes one SDN controller 120, other embodiments may include two or more SDN controllers 120 that function together to determine and control routes through the network 102. The scale and configuration of the network 102 will play a role in determining how many SDN controllers 120 are used in the network 102. For example, in a small geographically localized network, it may be sufficient to have one SDN controller 120. In a global network however, multiple SDN controllers 120 may be deployed at each data center where forwarding switches and other networking components are located. As another example, a large, international network may include multiple SDN controller 120 distributed at varying locations for distributing the processing load of each SDN controller 120 and providing fault tolerance.

The forwarding switches (P1-P5) communicate with the SDN controller 120 to receive routing information to be used for routing packets through the backbone network 102. In a first embodiment, the SDN controller 120 may compute routes and forward those routes to the forwarding switches (P1-P5). That is, high speed memory within the line cards are prepopulated with routes computed by the SDN controller 120 prior to routing packets through the backbone network 102. In another embodiment, the SDN controller 120 may respond to queries from each forwarding switch concerning packet forwarding and provide routes to the forwarding switch after it has received the packets. In other embodiments, the two embodiments described above may also be practiced in combination.

Routing in the described architecture may be performed based on multiprotocol label switching (MPLS), or more specifically MPLS labels, as opposed to using layer 2 or layer 3 headers. Thus, for example, as opposed to analyzing each IPv4 or IPv6 address in a data packet, the present architecture may make forwarding decisions at a higher layer of abstraction where forwarding decisions are made without analyzing the specific IP address or other layer 2 or layer 3 header information, but rather an MPLS label that represents a plurality of IP addresses or other Layer-3 or Layer-2 header information. Such an implementation is particularly useful in a backbone network setting where hardware resources, such as table lookup capacities, are limited. Additionally, MPLS labels are generally shorter and easier to decipher than layer 2 or layer 3 information in each packet, thus allowing the use of high speed, hardwired routing mechanisms, such as application specific integrated circuits (ASICS) that are relatively inexpensive to implement and maintain.

In one embodiment, multiple forwarding switches (P1-P2) may be configured as a multi-chassis link aggregation group (MC-LAG) for one or more edge devices (e.g., provider edge device 114 and/or provider edge router 112). Such a configuration may provide certain benefits, such as reduction of a configuration for static LSP label mappings on the edge devices. Specifically, only one or a few static LSP mappings for each edge device may be required, and not one for each forwarding switch provisioned in the network.

Figure 2A:
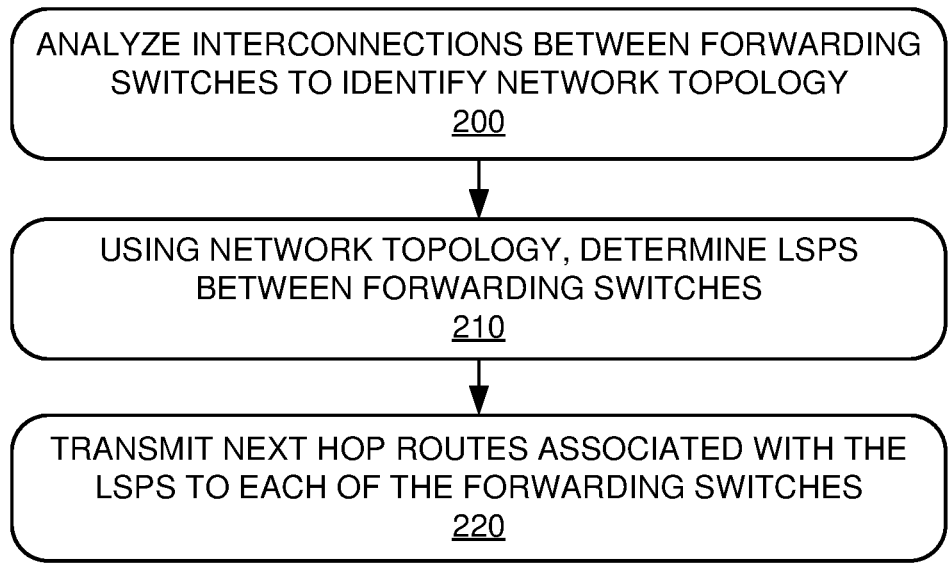
FIG. 2A illustrates an example process that may be performed to manage and control routes through a communication network according to the teachings of the present disclosure.

FIG. 2A illustrates an example process that may be performed by the SDN controller 120 to manage and control routes through the communication network 102 according to the teachings of the present disclosure. In operation 200, the SDN controller 120 analyzes the network, which in the simplified example includes forwarding switches (P1-P5), to identify the interconnections between the forwarding switches. Here, it can be seen that P1 is connected to P3 and P4, P2 is connected to P3 and P4, P3 is connected to P5 as well as directly to the external provider edge router 112, and P4 is connected to P5, which also has a connection to the external provider edge router. These interconnections represent possible paths through the network. Thus, for example, a packet may traverse the network from P1 to P4 to P5, and a packet may also traverse the network from P1 to P3 to P5. The aggregate of these interconnections represent the topology of the network.

In one embodiment, the SDN controller 120 discovers the forwarding switches (P1-P5), such as through the link layer discovery protocol (LLDP) and the connections between. In other embodiments, any suitable type of protocol may be used to discover the topology of the communication network 102. Additionally, the SDN controller 120 learns the topology of the backbone network 120 using multiple characteristics of each interconnection commonly referred to as an "IGP metric." These characteristics may be used by the SDN controller 120 to determine one or more optimal paths for packets through the network 120.

Once the network topology is understood, the SDN controller 120 may apply any number of possible routing algorithms, as well as customized routing algorithms, to the network topology to define MPLS paths through the network in operation 210. For example, a least cost routing algorithm, a dijkstra routing algorithm, a geographic routing algorithm, hierarchal routing algorithm, and/or a multipath routing algorithm may be used. In another example, the SDN controller may include a customized route for specific routing information. In yet another example, multiple routing algorithms may be used in combination.

According to one aspect, the SDN controller 120 implements a multiprotocol label switching (MPLS) mechanism for forwarding packets through the network 102 in which each route is referred to as a label switched path (LSP). To accomplish this, the SDN controller 120 executes a label distribution protocol (LDP) that generates label mapping information for the communication network and transmits the label mapping information to each forwarding switch in the backbone network 102. That is, the SDN controller 120 designates unique labels for each forwarding switch in the backbone network 102 that are used for routing packets through the backbone network 102.

The SDN controller 120 determines the routes according to an MPLS protocol. The MPLS protocol is a mechanism used in data networks in which packets are routed through nodes (e.g. edge devices and forwarding switches) of the network using labels appended to each packet, rather than by inspection of each layer 2 or layer 3 address of each packet. So for example, regardless of the least cost routing route, the SDN controller 120 may determine a LSP and identify that path with a label (e.g., XYZ) such that any packet with that routing label may be directed to traverse the network according to next hop routes determined by the SDN controller 120, and downloaded to each forwarding switch (P1-P5).

In such an architecture and in contrast to an architecture in which the SDN controller determines the LSPs (e.g., routes) through the network, the forwarding switches do not require MPLS signaling or label distribution protocols (e.g.: LDP, RSVP, and/or BGP) to exchange MPLS labels. That is, the forwarding switches (P1-P5) may be void of any routing functionality thus reducing their costs while enhancing the reliability by reducing the complexity of hardware and software used in the forwarding switches.

Each LSP extends from one edge device to another edge device (e.g., provider edge device 114 and provider edge router 112) and includes one or more next hop routes to be performed by any forwarding switch (P1-P5) along that route. For example, as shown in FIG. 1, one particular LSP 122 may extend through provider edge device 114, forwarding switch P1, forwarding switch P3, and end at provider edge router 112. In this case, the SDN controller 120 determines a next hop route 124a that instructs forwarding switch P1 to forward packets along that LSP 122 to forwarding switch P3, and another next hop route 124b that instructs forwarding switch P3 to forward packets along that path to provider edge router 112. Thus, when packets associated with that particular LSP 122 are subsequently received at the forwarding switch P1, it forwards the packets to forwarding switch P3 according to its received next hop route 124a, which is then forwarded to provider edge router 112 by forwarding switch P3 according to its received next hop route 124b.

To generate LSPs, the SDN controller 120 includes a route reflector (RR) function that interfaces with a border gateway protocol (BGP) instance executed on each of the provider edge device 114 and provider edge router 112 to learn destinations of all packet traffic through the backbone network 102. The RR function uses the BGP instance to resolve next hop routes for each adjacent node (e.g., provider edge device 114, provider edge router 112, and forwarding switches (P1-P5)) in the backbone network 120. The SDN controller 120 also stores loopback interface information for each edge device (i.e., provider edge device 120, and provider edge router 112) since that is what is used by the BGP to resolve its next hop route to other nodes. Additionally, the SDN controller 120 uses the stored loopback interface information about each edge device to resolve the source and destinations of the LSPs.

Now referring to an example packet from the first customer network destined for the second customer network the packet from (CE) router to a conventional ingress provider edge router will conduct a conventional border gateway protocol (BGP) routing look-up using an IP destination address of the packet, where the look-up occurs in a BGP routing table. This result of the lookup in the BGP routing table is the next-hop IP address of the loopback interface of an egress PE, and an associated MPLS tunnel label with that loopback interface of the egress PE, at the far-end of the network where there is a customer (destination) network attached to that egress PE router. The ingress PE router then adds that MPLS label to the packet and forwards the MPLS encapsulated packet to the Backbone label switch router (P1 or P2). Thus, packets arriving at the backbone label switch router (forwarding switches P1 and P2) will cause the MPLS label switch router to perform a lookup based on the incoming MPLS label to determine the appropriate LSP that is used to forward the MPLS packet to the next forwarding switch and, ultimately, to the destination PE at the remote end of the network. The key point is that forwarding entries (LSP entries) in each label forwarding switch are provided solely by the SDN controller.

In one embodiment, the SDN controller 120 uses stored loopback interface information of all PE devices to generate label forwarding information base (LFIB) entries that are subsequently transmitted to each edge device (e.g., provider edge router 112 and provider edge device 114) in the backbone network 102. The LFIB is transmitted to each edge device using any suitable protocol, such as a netconf protocol, a command line interface (CLI) protocol, or an openflow protocol. Once the LFIB is received by each edge device, the LFIB is processed by the edge device to identify next hop routes (i.e., routing actions) corresponding with each LSP across the Backbone to a remote PE. The forwarding switches, (P1-P5), receive routing information for each next hop route, (egress PE Loopback interface), to LSP mapping from LFIB information generated by the SDN controller 120. Certain embodiments including such functionality may reduce the complexity of the forwarding switches by placing route resolution functionality in the SDN controller 120 and edge devices rather than in the forwarding switches. In some embodiments, the edge devices may also generate additional LFIB actions to enable label-swapping and/or label pushing by the forwarding switches, when these devices interface with nodes of other networks, such as a broader inter-city backbone network.

In one embodiment, one or more bypass LSPs (e.g., routes) may be determined for each LSP thus providing for increased reliability in the event that the primary LSP fails or begins to operate below a specified level of performance.

In operation 220, the next hop routes (e.g., one-hop of a LSP), are then transmitted to several individual forwarding switches to construct an edge-to-edge LSP (i.e., tunnel) across the Backbone network 102. These MPLS LSP's may be loaded into line card memory of the forwarding switches.

Although FIG. 2A describes one example of a process that may be performed by the SDN controller 120 to manage and control routes through the communication network 102, the features of disclosed process may be embodied in other specific forms without deviating from the spirit and scope of the present disclosure. For example, the disclosed operations may be performed sequentially or simultaneously with one another. As another example, the disclosed operations may be performed in any suitable sequence and not just in the sequence described herein.

Figure 2B:
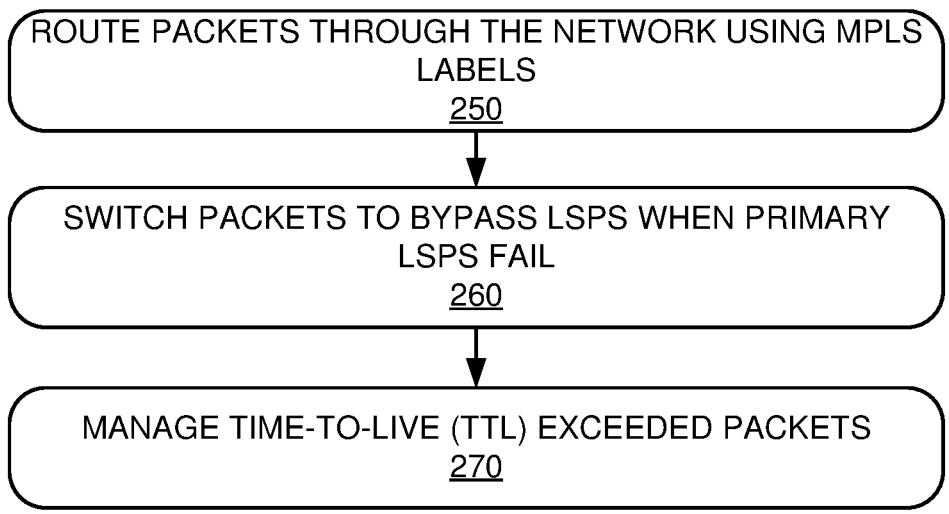
FIG. 2B illustrates an example process for routing packets through a communication network according to the teachings of the present disclosure.

FIG. 2B illustrates an example process for routing packets through the communication network 102 according to the teachings of the present disclosure. More specifically, FIG. 2B describes various actions that may be taken after the next hop routes are generated and stored in the forwarding switches as described above with reference to FIG. 2A. In operation 250, the forwarding switches (P1-P5) route packets through the communication network 102 according to their programmed next hop routes.

In operation 260, each forwarding switch (P1-P5) reacts autonomously to a local link-failure and immediately switches traffic onto a Bypass LSP. A bypass LSP generally refers to another LSP that is redundant to the main path, but routed through differing forwarding switches such that, in the event that a forwarding switch through which the main LSP travels should fail, packets may be transferred over to the bypass LSP. The forwarding switch may react to any failure indication, such as a Loss-of-Signal (LOS) or Loss-of-Light (LOL) to initiate switchover. Additionally, each forwarding switch may also use a local, onboard implementation of Link Aggregation Control Protocol (LACP) and/or a Bidirectional Forwarding Detection (BFD) to detect failures, which may not be adequately noticed by the LOS or LOL indications. In effect, the forwarding switch would autonomously perform an action similar to that of the Fast Re-Route Point-of-Local-Repair (PLR) where it automatically appends a new MPLS label to packets to temporarily detour traffic around the failure. In addition, the forwarding switch would notify the SDN Controller 120 of the failure such that the SDN controller 120 could re-calculate and re-optimize primary LSP's through the network, as appropriate. This may include programming new primary LSPs through the network and performing Make-Before-Break (MBB) actions, as required.

In operation 270, each forwarding switch (P1-P5) manages time-to-live (TTL) exceeded packets. In one embodiment, each forwarding switch determines any TTL exceeded packets, generates an Internet control message protocol (ICMP) Destination Unreachable response, encapsulates that with the original MPLS (outermost) label set and forwarding the encapsulated packet to the egress edge device associated with the LSP. In another embodiment, the forwarding switch transmits information associated with the TTL exceeded packet to the SDN controller 120 such that the SDN controller 120 generates a MPLS label stack that may be used for transmitting the TTL exceeded packet back to the ingress edge device. In yet another embodiment, the SDN controller 120 may wrap the ICMP TTL exceeded message in a uniform datagram protocol (UDP) (e.g., GRE or IP) tunnel that directs the TTL exceeded packet back to the ingress edge device associated with the LSP.

Although FIG. 2B describes one example of a process that may be performed by the forwarding switches (P1-P5) for routing packets through the communication network 102, the features of disclosed process may be embodied in other specific forms without deviating from the spirit and scope of the present disclosure. For example, the disclosed operations may be performed after or simultaneously with the operations described above with respect to FIG. 2A. As another example, the forwarding switches (P1-P5) may perform additional, fewer, or different operations than those operations as described in the present example.

The described systems, methods and apparatus, provide several advantages over conventional systems. For example, the system may provide customizable network services and allow for much more rapid introduction of new services. The system may be more robust as compared to vertically integrated system (particularly at software) which have tended to have more bugs simply resulting from the sheer complexity of conventional vertically integrated systems that are required to include many functions for conforming standards for interoperating autonomously with other devices. A substantial portion of the software complexity of the forwarding switches are provided in the SDN controller 120 allowing for far less expensive and complicated hardware switches relative to conventional routers and switches. Finally, the overall system (combination of SDN controller and hardware switches) can also be customizable to provide unique or customized routes not otherwise decided by conventional routing protocols.

Figure 3:
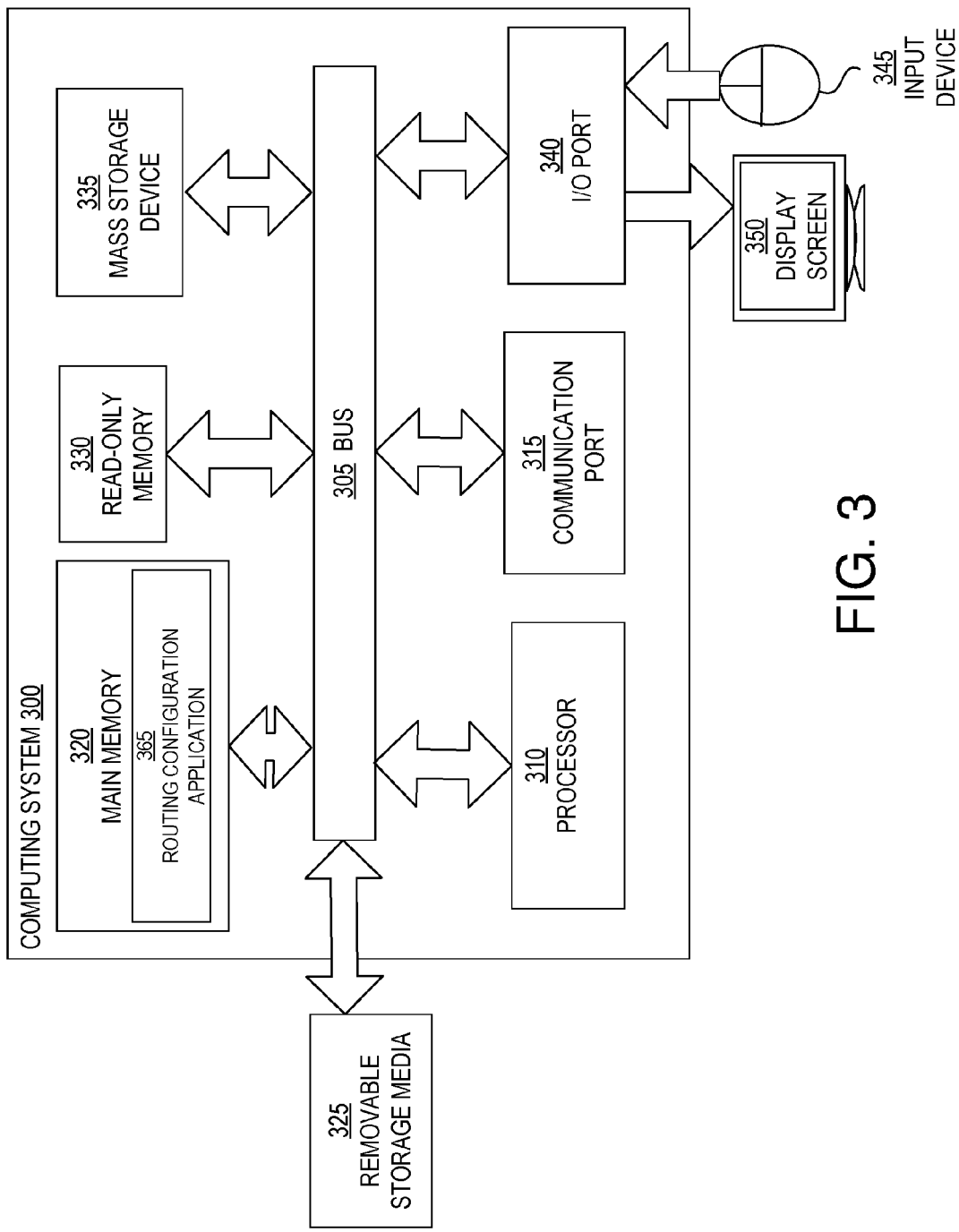
FIG. 3 is an example computing system that may implement various systems and methods discussed herein.

FIG. 3 is an example computing system 300 that may implement various systems and methods discussed herein. The computing system may embody the SDN controller 120 discussed herein. The computing system may also provide the functionality of the forwarding switches (P1-P5) as discussed herein.

The computing system 300 includes at least one processor 310, at least one communication port 315, a main memory 320, a removable storage media 325, a read-only memory 330, a mass storage device 335, and an I/O port 340. Processor(s) 310 can be any known processor, such as, but not limited to, an Intel® Itanium® or Itanium 2® processor(s), AMD® Opteron® or Athlon MP® processor(s), or Motorola® lines of processors. The communication port 315 can be any type, such as an RS-232 port for use with a modem based dial-up connection, a 10/100 Ethernet port, a Gigabit port using copper or fiber, or a USB port. Communication port(s) 315 may be chosen depending on a network such as a Local Area Network (LAN), a Wide Area Network (WAN), or any network to which the computer system 300 connects. The computing system 300 may be in communication with peripheral devices (e.g., display screen 350 and a user input device 516) via Input/Output (I/O) port 340.

Main memory 320 can be Random Access Memory (RAM) or any other dynamic storage device(s) commonly known in the art. Read-only memory 330 can be any static storage device(s) such as Programmable Read-Only Memory (PROM) chips for storing static information such as instructions for processor 310. Mass storage device 335 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

The bus 305 communicatively couples processor(s) 310 with the other memory, storage and communications blocks. The bus 305 can be a PCI/PCI-X, SCSI, or Universal Serial Bus (USB) based system bus (or other) depending on the storage devices used. Removable storage media 325 can be any kind of external hard drives, floppy drives, OMEGA® Zip Drives, Compact Disc-Read Only Memory (CD-ROM), Compact Disc-Re-Writable (CD-RW), Digital Video Disk-Read Only Memory (DVD-ROM), etc.

The computer system 300 includes one or more processors 310. The processor 310 may include one or more internal levels of cache (not shown) and a bus controller or bus interface unit to direct interaction with the processor bus 305. The main memory 320 may include one or more memory cards and a control circuit (not shown), or other forms of removable memory, and may store a routing configuration application 365 including computer executable instructions, that when run on the processor, implement the methods and system set out herein, such as the method discussed with reference to FIGS. 2A and 2B. Other forms of memory, such as a mass storage device 335, a read only memory 330, and a removable storage memory 325, may also be included and accessible, by the processor (or processors) 310 via the bus 305.

The computer system 300 may further include a communication port 315 connected to a transport and/or transit network 355 by way of which the computer system 300 may receive network data useful in executing the methods and system set out herein as well as transmitting information and network configuration changes and MPLS routes or other routes determined thereby. The computer system 300 may include an I/O device 340, or other device, by which information is displayed, such as at display screen 350, or information is input, such as input device 345. The input device 345 may be alphanumeric input device, including alphanumeric and other keys for communicating information and/or command selections to the processor. The input device 345 may be another type of user input device including cursor control, such as a mouse, a trackball, or cursor direction keys for communicating direction information and command selections to the processors 310 and for controlling cursor movement on the display device 350. In the case of a tablet device, the input may be through a touch screen, voice commands, and/or Bluetooth connected keyboard, among other input mechanisms. The system set forth in FIG. 3 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. An apparatus comprising:
   a network controller comprising at least one processor and at least one memory to store a routing configuration application that is executed by the at least one processor to:
   analyze a plurality of interconnections between a plurality of forwarding switches of a communication network to identify a network topology of the communication network;
   determine at least one label switched path (LSP) between the forwarding switches, the LSP comprising one or more next hop routes each defining a forwarding address associated with one forwarding switch to an adjacent forwarding switch;
   determine at least one bypass LSP that is redundant to one or more LSPs determined by the routing configuration application, wherein each forwarding switch executes at least one of a Link Aggregation Control Protocol (LACP) and a Bidirectional Forwarding Detection (BFD) to detect a failure in the LSP and perform switchover to the bypass LSP;

generate a label forwarding information base (LFIB) including mapping information associated with next hop routes of the bypass LSP; and in response to a query from the forwarding switches after the forwarding switches have received packets, transmit the LFIB to the forwarding switches, wherein at least one of the forwarding switches is configured to:

process the LFIB to identify the next hop routes of the bypass LSP; and use the next hop routes of the bypass LSP to route at least some of the packets through the network according to a multiprotocol label switching (MPLS) protocol, wherein the network controller comprises a route reflector (RR) function that interfaces with a border gateway protocol (BGP) instance executed on an edge device to determine the LSP by resolving next hop routes for each adjacent forwarding switch.

2. The apparatus as recited in claim 1, wherein the forwarding switches do not autonomously determine the one or more next hop routes of the bypass LSP.

3. The apparatus as recited in claim 1, wherein the LFIB is transmitted to the edge device using at least one of a netconf protocol, a CLI protocol, or an openflow protocol.

4. The apparatus as recited in claim 1, wherein the network controller configures one or more of the forwarding switches in a multi-chassis link aggregation group (MC-LAG).

5. The apparatus as recited in claim 1, wherein the network controller identifies the network topology of the communication network using a link layer discovery protocol (LLDP).

6. The apparatus as recited in claim 1, wherein the network controller determines the LSP using at least one of a least cost routing algorithm, a dijkstra routing algorithm, a geographic routing algorithm, hierarchal routing algorithm, or a multipath routing algorithm.

7. The apparatus as recited in claim 1, wherein the network controller comprises a software defined network (SDN) controller.

8. A network control method comprising:

analyzing, by a network controller, a plurality of interconnections between a plurality of forwarding switches of a communication network to identify a network topology of the communication network;

identifying the network topology of the communication network using a link layer discovery protocol (LLDP);

determining, by the network controller, at least one label switched path (LSP) between the forwarding switches, the LSP comprising one or more next hop routes each defining a forwarding address associated with one forwarding switch to an adjacent forwarding switch;

determining at least one bypass LSP that is redundant to the LSP;

executing, by each forwarding switch, at least one of a Link Aggregation Control Protocol (LACP) and a Bidirectional Forwarding Detection (BFD) to detect a failure in the LSP and perform switchover to the bypass LSP;

generating a label forwarding information base (LFIB) including mapping information associated with next hop routes of the bypass LSP; and in response to a query from the forwarding switches after the forwarding switches have received packets, transmitting, by the network controller, the LFIB to the forwarding switches, wherein at least one of the forwarding switches is configured to:

process the LFIB to identify the next hop routes of the bypass LSP; and use the next hop routes of the bypass LSP to route at least some of the packets through the network according to a multiprotocol label switching (MPLS) protocol; and wrapping, by the network controller, a time-to-live (TTL) exceeded packet in a uniform datagram protocol (UDP) tunnel that directs the TTL exceeded packet to an ingress switch associated with the at least one LSP.

9. The network control method as recited in claim 8, wherein the forwarding switches do not autonomously determine the next hop routes of the bypass LSP.

10. The network control method as recited in claim 8, further comprising interfacing, by a route reflector (RR) configured in the network controller, with a border gateway protocol (BGP) instance executed on an edge device to determine the LSP by resolving next hop routes for each adjacent forwarding switch.

11. The network control method as recited in claim 8, further comprising transmitting the LFIB to the edge device using at least one of a netconf protocol, a CLI protocol, or an openflow protocol.

12. The network control method as recited in claim 8, further comprising configuring one or more of the forwarding switches in a multi-chassis link aggregation group (MC-LAG).

13. The network control method as recited in claim 8, further comprising determining the LSP using at least one of a least cost routing algorithm, a dijkstra routing algorithm, a geographic routing algorithm, hierarchal routing algorithm, or a multipath routing algorithm.

14. A communication network system comprising:

a plurality of forwarding switches interconnected with one another; and a network controller comprising at least one processor and at least one memory to store a routing configuration application that is executed by the at least one processor to:

analyze a plurality of interconnections between the plurality of forwarding switches of a communication network to identify a network topology of the communication network, determine at least one label switched path (LSP) between the forwarding switches, the LSP comprising one or more next hop routes each defining a forwarding address associated with one forwarding switch to an adjacent forwarding switch;

determine at least one bypass LSP that is redundant to the LSP determined by the routing configuration application, wherein each forwarding switch executes at least one of a Link Aggregation Control Protocol (LACP) and a Bidirectional Forwarding Detection (BFD) to detect a failure in the LSP and perform switchover to the bypass LSP; and transmit next hop routes of the bypass LSP to the forwarding switches in response to a query from the forwarding switches after the forwarding switches have received packets, the forwarding switches using the next hop routes of the bypass LSP to route the packets through the network according to a multiprotocol label switching (MPLS) protocol, wherein the network controller comprises a route reflector (RR) function that interfaces with a border gateway protocol (BGP) instance executed on an edge device to determine the LSP by resolving next hop routes for each adjacent forwarding switch.

15. The system as recited in claim 14, wherein the network controller transmits the next hop routes of the bypass LSP to the forwarding switches by generating a label forwarding information base (LFIB) including mapping information associated with the next hop routes and transmitting the LFIB to one or more edge devices configured in the communication network.

16. The system as recited in claim 15, wherein the LFIB is transmitted to the one or more edge devices using at least one of a netconf protocol, a CLI protocol, or an openflow protocol.

* * * * *